(12) United States Patent
Lee et al.

(10) Patent No.: US 9,957,424 B2
(45) Date of Patent: May 1, 2018

(54) PRESSURE-SENSITIVE ADHESIVE COMPOSITION

(71) Applicant: LG Chem, Ltd., Seoul (KR)

(72) Inventors: Min Ki Lee, Daejeon (KR); No Ma Kim, Daejeon (KR); Jeong Ae Yoon, Daejeon (KR); Kee Young Kim, Daejeon (KR); Han Na Chi, Daejeon (KR)

(73) Assignee: LG Chem, Ltd. (KR)

( * ) Notice: Subject to any disclaimer, the term of this patent is extended or adjusted under 35 U.S.C. 154(b) by 75 days.

(21) Appl. No.: 14/898,289

(22) PCT Filed: Jun. 18, 2014

(86) PCT No.: PCT/KR2014/005374
§ 371 (c)(1),
(2) Date: Dec. 14, 2015

(87) PCT Pub. No.: WO2014/204212
PCT Pub. Date: Dec. 24, 2014

(65) Prior Publication Data
US 2016/0145475 A1 May 26, 2016

(30) Foreign Application Priority Data

Jun. 19, 2013 (KR) .................. 10-2013-0070538
Feb. 13, 2014 (KR) .................. 10-2014-0016846

(51) Int. Cl.
*C09J 7/38* (2018.01)
*C09J 7/22* (2018.01)
*C09J 7/30* (2018.01)
*C09J 153/00* (2006.01)
*C09J 133/06* (2006.01)
*G02F 1/1335* (2006.01)
*C09J 4/06* (2006.01)
*C08F 293/00* (2006.01)
*G02B 5/30* (2006.01)

(52) U.S. Cl.
CPC ......... *C09J 153/00* (2013.01); *C08F 293/005* (2013.01); *C09J 4/06* (2013.01); *C09J 7/22* (2018.01); *C09J 7/30* (2018.01); *C09J 7/38* (2018.01); *C09J 7/385* (2018.01); *C09J 7/387* (2018.01); *G02F 1/133528* (2013.01); *C09J 133/066* (2013.01); *C09J 2201/606* (2013.01); *C09J 2203/318* (2013.01); *C09J 2433/00* (2013.01); *C09J 2453/00* (2013.01); *G02B 5/3025* (2013.01); *G02B 5/3033* (2013.01)

(58) Field of Classification Search
None
See application file for complete search history.

(56) References Cited

U.S. PATENT DOCUMENTS

| | | | |
|---|---|---|---|
| 7,744,976 B2* | 6/2010 | Katoh | C09J 7/00 347/102 |
| 2005/0181148 A1 | 8/2005 | Kim et al. | |
| 2006/0024521 A1 | 2/2006 | Everaerts et al. | |
| 2009/0275705 A1 | 11/2009 | Fujita et al. | |
| 2011/0033720 A1 | 2/2011 | Fujita et al. | |
| 2011/0111220 A1* | 5/2011 | Takarada | C09J 7/00 428/345 |
| 2011/0230609 A1 | 9/2011 | Oshita et al. | |
| 2013/0079468 A1 | 3/2013 | Kanemura et al. | |
| 2014/0242303 A1 | 8/2014 | Lee et al. | |
| 2014/0276483 A1* | 9/2014 | Liao | A61K 31/4458 604/307 |

FOREIGN PATENT DOCUMENTS

| | | |
|---|---|---|
| CN | 1764679 A | 4/2006 |
| CN | 1989216 A | 6/2007 |
| EP | 1865003 A1 | 12/2007 |
| EP | 2366750 A1 | 9/2011 |
| JP | 09324165 | 12/1997 |
| JP | 11-116644 A | 4/1999 |
| JP | 2013054517 A | 3/2013 |
| JP | 2014159511 A | 9/2014 |
| JP | 2015525261 A | 9/2015 |
| KR | 20050076706 A | 7/2005 |
| KR | 20090113515 A | 11/2009 |
| KR | 20110002857 A | 1/2011 |
| KR | 101023839 B1 | 3/2011 |
| KR | 101171976 B1 | 8/2012 |
| KR | 101171977 B1 | 8/2012 |
| TW | 200720387 | 6/2006 |
| TW | 201202385 A | 1/2012 |
| WO | 2004050781 A1 | 6/2004 |
| WO | 2010064551 A1 | 6/2010 |

OTHER PUBLICATIONS

Aldrich Data Sheet (2017).*
Aldrich Data Sheet (2018).*
International Search Report for Application No. PCT/KR2014/005374 dated Sep. 26, 2014.
Taiwanese Search Report for Application No. 103121223 dated Jun. 30, 2015.
Extended Search Report European Application No. 14813313.5, dated Nov. 9, 2016.
IPO Search Report from Taiwanese Application No. 103121223, dated Jul. 19, 2016.

* cited by examiner

*Primary Examiner* — Frank D Ducheneaux
(74) *Attorney, Agent, or Firm* — Lerner, David, Littenberg, Krumholz & Mentlik, LLP

(57) ABSTRACT

The present invention relates to a pressure-sensitive adhesive composition, a pressure-sensitive adhesive optical member, a pressure-sensitive adhesive polarizing plate, and a display device. The pressure-sensitive adhesive composition of the present invention can form a pressure-sensitive adhesive having excellent durability and light leakage prevention property under severe conditions such as a high temperature condition, a high temperature and high humidity condition, or under a severe condition where a high temperature/high humidity and a normal temperature/low humidity are repeated.

17 Claims, No Drawings

PRESSURE-SENSITIVE ADHESIVE COMPOSITION

CROSS-REFERENCE TO RELATED APPLICATION

This application is a national phase entry under 35 U.S.C. § 371 of International Application No. PCT/KR2014/005374, filed Jun. 18, 2014, which claims priority to Korean Patent Application No. 10-2013-0070538, filed on Jun. 19, 2013 and Korean Patent Application No. 10-2014-0016846, filed on Feb. 13, 2014, the disclosure of which is incorporated herein by reference.

BACKGROUND

1. Field of the Invention

The present invention relates to a pressure-sensitive adhesive composition, a pressure-sensitive adhesive optical member, a pressure-sensitive adhesive polarizing plate, and a display device.

2. Discussion of Related Art

In order to realize a display device, a pressure-sensitive adhesive or glue may be used. For example, a liquid crystal display device (hereinafter, referred to as "LCD device") as a representative display device includes a liquid crystal panel and an optical film such as a polarizing plate. In order to laminate such optical films or attach the optical film to the liquid crystal panel, a pressure-sensitive adhesive or glue may be used. Patent Documents 1 to 3 describe a pressure-sensitive adhesive as described above.

Patent Document 1: Korean Patent No. 1023839
Patent Document 2: Korean Patent No. 1171976
Patent Document 3: Korean Patent No. 1171977

SUMMARY OF THE INVENTION

The present invention is directed to a pressure-sensitive adhesive composition, a pressure-sensitive adhesive optical member, a pressure-sensitive adhesive polarizing plate, and a display device.

An exemplary pressure-sensitive adhesive composition may include a block copolymer. The term "block copolymer" as used in the present specification may refer to a copolymer including blocks of different polymerized monomers.

In an exemplary embodiment, the block copolymer may include a first block having a glass transition temperature of 50° C. or more and a second block having a glass transition temperature of −10° C. or less. In the present specification, "glass transition temperature of a certain block" in the block copolymer may refer to a glass transition temperature measured or calculated from a polymer formed of only monomers included in the block. The glass transition temperature of the first block may be, for example, 60° C. or more, 65° C. or more, 70° C. or more, 75° C. or more, 80° C. or more, or 90° C. or more. The upper limit of the glass transition temperature of the first block is not particularly limited, and may be, for example, about 150° C., about 140° C., about 130° C., or about 120° C. The glass transition temperature of the second block may be, for example, −15° C. or less, or −30° C. or less. The lower limit of the glass transition temperature of the second block is not particularly limited, and may be, for example, about −80° C., about −70° C., about −60° C., or about −55° C.

The block copolymer including the first and second blocks respectively having the glass transition temperatures in the above ranges may form an appropriate micro-phase separation structure within the pressure-sensitive adhesive, and the pressure-sensitive adhesive including such a phase separation structure has adequate cohesion and stress relaxation property and also has excellent dependability, light leakage prevention property, and reworkability.

If necessary, molecular weights of the first and/or second block or the block copolymer may be regulated. The first block may be regulated to have a number average molecular weight (Mn) in a range of, for example, 2,500 to 150,000. The number average molecular weight of the first block may refer to, for example, a number average molecular weight of a polymer prepared by polymerizing only monomers constituting the first block. The "number average molecular weight" as used in the present specification can be measured by a typical method using, for example, a GPC (Gel Permeation Chromatography). In another exemplary embodiment, the number average molecular weight of the first block may be 5,000 to 150,000 or 10,000 to 50,000.

The block copolymer may have a number average molecular weight of 50,000 to 300,000. In another exemplary embodiment, the number average molecular weight of the block copolymer may be about 90,000 to about 250,000, about 90,000 to about 200,000, or about 90,000 to about 180,000.

The block copolymer may have a molecular weight distribution (PDI; Mw/Mn), i.e. a ratio (Mw/Mn) of a weight average molecular weight (Mw) to a number average molecular weight (Mn), in a range of about 1.0 to about 2.5, about 1.3 to about 2.2, or about 1.6 to about 1.9.

With the block copolymer having the molecular weight characteristic as described above, a pressure-sensitive adhesive composition or pressure-sensitive adhesive having excellent properties can be provided.

The block copolymer may be a cross-linkable copolymer including a cross-linkable functional group. The term "cross-linkable functional group" as used in the present specification may refer to a functional group which is provided at a side chain or an end of a polymer and can react with at least a functional group of a multifunctional cross-linker to be described below. Examples of the cross-linkable functional group may include a hydroxyl group, an isocyanate group, or a glycidyl group. Preferably, a hydroxyl group may be used, but an available cross-linkable functional group is not limited thereto.

If the cross-linkable functional group is included, the functional group may be included in, for example, the block having a relatively low glass transition temperature, i.e. the second block.

In an example, the cross-linkable functional group is not included in the first block but included in the second block only. If the cross-linkable functional group is included in the second block, adequate cohesion and stress relaxation property are exhibited, and it is possible to form a pressure-sensitive adhesive that maintains excellent dependability, light leakage prevention property, and reworkability.

Monomers of the first block and the second block in the block copolymer are not particularly limited in kind as long as the glass transition temperatures as described above can be obtained by combination of the respective monomers.

The first block may include a polymerized unit induced from a (meth)acrylic acid ester monomer. In the present specification, a monomer included as a polymerized unit in a polymer or a block may mean that the monomer forms a skeleton, for example, a main chain or a side chain, of the polymer or the block through a polymerization reaction. As the (meth)acrylic acid ester monomer, for example, alkyl (meth)acrylate may be used. In consideration of regulation of cohesion, a glass transition temperature, and a pressure-sensitive adhesive property, alkyl (meth)acrylate including an alkyl group having 1 to 20 carbon atoms, 1 to 16 carbon atoms, 1 to 12 carbon atoms, 1 to 8 carbon atoms, or 1 to 4 carbon atoms may be used. The alkyl group may be a straight chain, branched chain, or cyclic alkyl group. Examples of the monomer may include methyl (meth) acrylate, ethyl (meth)acrylate, n-propyl (meth)acrylate, isopropyl (meth)acrylate, n-butyl (meth)acrylate, t-butyl (meth) acrylate, sec-butyl (meth)acrylate, pentyl (meth)acrylate, 2-ethylhexyl (meth)acrylate, 2-ethylbutyl (meth)acrylate, n-octyl (meth)acrylate, isobornyl (meth)acrylate, isooctyl (meth)acrylate, isononyl (meth)acrylate, or lauryl (meth) acrylate. One or two or more monomers may be selected from the above-described monomers and used such that the above-described glass transition temperature can be obtained.

In consideration of easiness in regulation of a glass transition temperature, among the above-descried monomers, a (meth)acrylic acid ester monomer such as alkyl (meth)acrylate including an alkyl group having 1 to 20 carbon atoms, 1 to 16 carbon atoms, 1 to 12 carbon atoms, 1 to 8 carbon atoms, or 1 to 4 carbon atoms may be used as the monomer constituting the first block.

The second block may include, for example, a polymerized unit derived from 90 to 99.9 parts by weight of a (meth)acrylic acid ester monomer and 0.1 to 10 parts by weight of a copolymerizable monomer having a cross-linkable functional group. In the present specification, the unit "parts by weight" may mean a weight ratio between components. For example, the second block including a polymerized unit derived from 90 to 99.9 parts by weight of a (meth)acrylic acid ester monomer and 0.1 to 10 parts by weight of a copolymerizable monomer having a cross-linkable functional group means that a weight ratio (A:B) of the (meth)acrylic acid ester monomer (A) and the copolymerizable monomer (B) having a cross-linkable functional group, which form the polymerized unit of the second block, is 90 to 99.9:1 to 10. In this weight ratio range, properties of the pressure-sensitive adhesive, such as a pressure-sensitive adhesive strength and durability, can be maintained excellent.

As the (meth)acrylic acid ester monomer constituting the second block, a monomer which can finally obtain a glass transition temperature in the above-described range through copolymerization with the copolymerizable monomer may be selected from the monomers, which can be included in the first block, and used. In consideration of easiness in regulation of a glass transition temperature, although not particularly limited, the (meth)acrylic acid ester monomer may employ an acrylic acid ester monomer such as alkyl acrylate including an alkyl group having 1 to 20 carbon atoms, 1 to 16 carbon atoms, 1 to 12 carbon atoms, 1 to 8 carbon atoms, or 1 to 4 carbon atoms from the above-described monomers.

As the copolymerizable monomer having a cross-linkable functional group which forms the second block, there may be used a compound having a portion which can be copolymerized with another monomer, such as an acrylic acid ester monomer, included in the block copolymer and also having the cross-linkable functional group. In the field of manufacturing an adhesive, various copolymerizable monomers having a cross-linkable functional group are well known, and such monomers can be used in the polymer. For example, as a copolymerizable monomer having a hydroxyl group, hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate, or 8-hydroxyoctyl (meth)acrylate, or hydroxyalkyleneglycol (meth)acrylate such as 2-hydroxyethyleneglycol (meth) acrylate or 2-hydroxypropyleneglycol (meth)acrylate may be used. As a copolymerizable monomer having a carboxyl group, (meth)acrylic acid, 2-(meth)acryloyloxy acetic acid, 3-(meth)acryloyloxy propylic acid, 4-(meth)acryloyloxy butyric acid, acrylic acid dimer, itaconic acid, maleic acid, or maleic acid anhydride may be used, but it is not be limited thereto.

If necessary, the first block and/or the second block may further include, for example, any other comonomer in order to regulate a glass transition temperature, and the monomer may be included as a polymerized unit. The comonomer may include nitrogen-containing monomers such as (meth) acrylonitrile, (meth)acrylamide, N-methyl (meth)acrylamide, N-butoxy methyl (meth)acrylamide, N-vinyl pyrrolidone, or N-vinyl caprolactam; styrene-based monomers such as styrene or methyl styrene; glycidyl group-containing monomers such as glycidyl (meth)acrylate; or carboxylic acid vinyl ester such as vinyl acetate, but is not limited thereto. One or two or more comonomers may be appropriately selected and included in a polymer as necessary. Such a comonomer may be included in the block copolymer in an amount of, for example, 20 parts by weight or less, or 0.1 part by weight to 15 parts by weight with respect to the weight of the other monomer in each block copolymer.

The block copolymer may include 5 to 50 parts by weight of the first block and 50 to 95 parts by weight of the second block. A weight ratio between the first block and the second block is not particularly limited, but by regulating the weight ratio between the blocks in the above-described range, it is possible to provide a pressure-sensitive adhesive composition and pressure-sensitive adhesive having excellent properties. In another example, the block copolymer may include 10 to 50 parts by weight of the first block and 50 to 90 parts by weight of the second block, 5 to 45 parts by weight of the first block and 55 to 95 parts by weight of the second block, or 5 to 40 parts by weight of the first block and 60 to 95 parts by weight of the second block.

In an example, the block copolymer may be a diblock copolymer formed of the first block and the second block, i.e. a block copolymer including only two blocks, the first block and the second block. Due to a use of the diblock copolymer, dependability, stress relaxation property, and reworkability of the pressure-sensitive adhesive can be maintained excellent.

A method of preparing the block copolymer is not particularly limited, and the block copolymer can be prepared by a typical method. The block copolymer can be polymerized by an Living Radical Polymerization (LRP) method. Examples of the LRP method include: anionic polymerization using an organic rare-earth metal composite as a polymerization initiator or using an organic alkali metal compound as a polymerization initiator for polymerization in the presence of inorganic acid salts such as salts of alkali metal or alkali earth metal; anionic polymerization using an organic alkali metal compound as a polymerization initiator for polymerization in the presence of an organic aluminum compound; atom transfer radical polymerization (ATRP) using an atom transfer radical polymerization agent as a polymerization control agent; ARGET (Activators Regenerated by Electron Transfer) atom transfer radical polymerization (ATRP) using an atom transfer radical polymerization agent as a polymerization control agent for polymerization in the presence of an organic or inorganic reducing agent that generates electrons; ICAR (Initiators for Continuous Activator Regeneration) atom transfer radical polymerization (ATRP); reversible addition-fragmentation chain transfer (RAFT) polymerization using an inorganic reducing agent and a reversible addition-fragmentation chain transfer agent; or a method using an organic tellurium compound as an initiator. An appropriate method can be selected from the above methods.

A pressure-sensitive adhesive composition may include an acrylic copolymer such as an acrylic random copolymer. The acrylic copolymer may include a cross-linkable functional group such as a thermal cross-linkable functional group. For example, the acrylic copolymer may include the same cross-linkable functional group as the block copolymer. If the acrylic copolymer is included, it is possible to improve a stress relaxation property of pressure-sensitive adhesive, and also possible to provide a pressure-sensitive adhesive having excellent durability and light leakage prevention property under severe conditions such as a high temperature condition, a high temperature and high humidity condition, and/or a condition where a high temperature/high humidity and a normal temperature/low humidity are repeated.

As the acrylic copolymer, there may be used a copolymer having a glass transition temperature of, for example, $-10°$ C. or less. In this range of a glass transition temperature, an acrylic copolymer addition effect can be increased, and durability under severe conditions can be more appropriately realized.

The acrylic copolymer may have a number average molecular weight of 200,000 or more, 300,000 or more, 400,000 or more, or 500,000 or more. In this range of a number average molecular weight, an acrylic copolymer addition effect can be increased. The upper limit of the number average molecular weight of the acrylic copolymer is not particularly limited, but can be determined in a range of, for example, about 3,000,000 or less.

Further, the acrylic copolymer may have a molecular weight distribution (PDI; Mw/Mn), i.e. a ratio (Mw/Mn) of a weight average molecular weight (Mw) to a number average molecular weight (Mn), in a range of about 2.0 to 4.5, 2.5 to 4.0, or 3.0 to 3.5. Since the acrylic copolymer having the above molecular weight distribution is included, a pressure-sensitive adhesive composition or pressure-sensitive adhesive having excellent properties can be provided.

The acrylic copolymer may be included in the pressure-sensitive adhesive composition in an amount of 5 parts by weight to 50 parts by weight with respect to 100 parts by weight of the block copolymer. In another example, the acrylic copolymer may be included in an amount of about 6 parts by weight to about 40 parts by weight or about 7 parts by weight to about 30 parts by weight with respect to 100 parts by weight of the block copolymer. In this range, the acrylic copolymer can exhibit an appropriate addition effect.

The acrylic copolymer may include a polymerized unit derived from a (meth)acrylic acid ester monomer and a copolymerizable monomer having a cross-linkable functional group. Each of the monomers includes the same examples as described with respect to the block copolymer, and appropriate monomers can be selected from the above-described monomers in consideration of the above-described glass transition temperature. For example, the acrylic copolymer may include a polymerized unit derived from 90 to 99.9 parts by weight of a (meth)acrylic acid ester monomer and 0.1 to 10 parts by weight of a copolymerizable monomer having a cross-linkable functional group. In this range, the acrylic copolymer can exhibit an appropriate addition effect.

The pressure-sensitive adhesive composition may include a multifunctional cross-linker. The cross-linker is a compound that can realize a cross-linked structure through a reaction with the cross-linkable functional group, and may be a compound including 2 or more, 2 to 10, 2 to 8, 2 to 6, or 2 to 4 functional groups which can react with the cross-linkable functional group. Such a cross-linker may be included in an amount of, for example, 0.01 parts by weight to 10 parts by weight, 0.015 parts by weight to 5 parts by weight, 0.02 parts by weight to 2.5 parts by weight, or 0.025 parts by weight to 1 part by weight with respect to 100 parts by weight of the block copolymer. In this range, adequate cohesion, durability, and stress relaxation property can be obtained.

As the multifunctional cross-linker, an adequate cross-linker may be selected from typical cross-linkers such as an isocyanate cross-linker, an epoxy cross-linker, an aziridine cross-linker, and a metal chelate cross-linker and used in consideration of a kind of a cross-linkable functional group included in the block copolymer or the acrylic copolymer.

The isocyanate cross-linker may include, for example, diisocyanate compounds such as tolylene diisocyanate, xylene diisocyanate, diphenylmethane diisocyanate, hexamethylene diisocyanate, isoboron diisocyanate, tetramethylxylene diisocyanate, or naphthalene diisocyanate, reaction products from a reaction between the above-described diisocyanate compounds and a polyol such as trimethylol propane, or isocyanurate adducts of the above-described diisocyanate compounds. The epoxy cross-linker may include, for example, one or more selected from the group consisting of ethyleneglycol diglycidylether, triglycidylether, trimethylolpropane triglycidylether, N,N,N',N'-tetraglycidyl ethylenediamine, and glycerin diglycidylether. The aziridine cross-linker may include, for example, N,N'-toluene-2,4-bis(1-aziridinecarboxamide), N,N'-diphenylmethane-4,4'-bis(1-aziridinecarboxamide), triethylene melamine, bisisoprothaloyl-1-(2-methylaziridine), or tri-1-aziridinylphosphineoxide, but is not limited thereto. The metal chelate cross-linker may include a compound in which a multivalent metal such as aluminum, iron, zinc, tin, titanium, antimony, magnesium, and/or vanadium is coordinated with acetyl acetone or acetoacetic acid ethyl, but is not limited thereto.

The pressure-sensitive adhesive composition may further include a silane coupling agent. As the silane coupling agent, there may be used a silane coupling agent having, for example, a β-cyano group or an acetoacetyl group. Such a silane coupling agent may enable a pressure-sensitive adhesive formed of a copolymer having a low molecular weight to exhibit excellent adhesion and adhesion stability and also to maintain excellent dependability under a heat-resistant and wet heat-resistant condition.

As the silane coupling agent having a β-cyano group or an acetoacetyl group, there may be used a compound expressed by, for example, the following Chemical Formula 1 or 2.

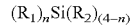   [Chemical Formula 1]

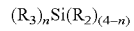   [Chemical Formula 2]

In the above Chemical Formula 1 or 2, $R_1$ represents a β-cyanoacetyl group or a β-cyanoacetyl alkyl group, $R_3$ represents an acetoacetyl group or an acetoacetyl alkyl group, $R_2$ represents an alkoxy group, and n represents a number of 1 to 3.

In the Chemical Formula 1 or 2, the alkyl group may be an alkyl group having 1 to 20 carbon atoms, 1 to 16 carbon atoms, 1 to 12 carbon atoms, 1 to 8 carbon atoms, or 1 to 4 carbon atoms, and such an alkyl group may be a straight chain, branched chain, or cyclic alkyl group.

In the Chemical Formula 1 or 2, the alkoxy group may be an alkoxy group having 1 to 20 carbon atoms, 1 to 16 carbon atoms, 1 to 12 carbon atoms, 1 to 8 carbon atoms, or 1 to 4 carbon atoms, and such an alkoxy group may be a straight chain, branched chain, or cyclic alkoxy group.

In the above chemical formula 1 or 2, the n may be, for example, 1 to 3, 1 to 2, or 1.

The compound of the Chemical Formula 1 or 2 may include, for example, acetoacetylpropyl trimethoxy silane, acetoacetylpropyl triethoxy silane, β-cyanoacetylpropyl trimethoxy silane, or β-cyanoacetylpropyl triethoxy silane, but is not limited thereto.

The silane coupling agent in the pressure-sensitive adhesive composition may be included in an amount of 0.01 part by weight to 5 parts by weight or 0.01 part by weight to 1 part by weight with respect to 100 parts by weight of the block copolymer. In this range, the silane coupling agent may function to effectively endow a pressure-sensitive adhesive with desired physical properties.

The pressure-sensitive adhesive composition may further include a tackifier, as necessary. For example, the tackifier may include a hydrocarbon resin or a hydrogenated product thereof, a rosin resin or a hydrogenated product thereof, a rosin ester resin or a hydrogenated product thereof, a terpene resin or a hydrogenated product thereof, a terpene phenol resin or a hydrogenated product thereof, a polymerized rosin resin, or polymerized rosin ester resin, which may be used alone or in combination, but is not limited thereto. In the pressure-sensitive adhesive composition, the tackifier may be included in an amount of 100 parts by weight or less with respect to 100 parts by weight of the block copolymer.

Further, if necessary, the pressure-sensitive adhesive composition may further include at least one additive selected from the group consisting of a curing agent, a UV stabilizer, an antioxidant, a coloring agent, a reinforcing agent, a filler, an antifoaming agent, a surfactant, and a plasticizer.

The pressure-sensitive adhesive composition may have a coating solid content of 20 weight % or more or 25 weight % or more. In the present specification, the term "coating solid content" may refer to a solid content of the pressure-sensitive adhesive composition, i.e. a coating solution, at the time when the pressure-sensitive adhesive composition is applied to a coating process in order to prepare a pressure-sensitive adhesive. The coating solid content can be measured by, for example, a method suggested in the following Example. Typically, at the time when the pressure-sensitive adhesive composition is applied to the coating process, the pressure-sensitive adhesive composition, i.e. the coating solution, may include the block copolymer, a cross-linker, an initiator, and other additives, and may also include a solvent. With a coating solid content of 20 weight % or more, productivity of a pressure-sensitive adhesive, an optical film, or a display device can be maximized. The upper limit of the coating solid content is not particularly limited, and may be suitably controlled within a range of, for example, 50 weight % or less, 40 weight % or less, or 30 weight % or less in consideration of viscosity to be applied to a coating process.

The pressure-sensitive adhesive composition may have a coating viscosity of about 500 cP to about 3,000 cP at 23° C. The term "coating viscosity" may refer to a viscosity of the pressure-sensitive adhesive composition, i.e. a coating solution, at the time when the pressure-sensitive adhesive composition is applied to a coating process in order to prepare a pressure-sensitive adhesive, and may be a viscosity in the state that the coating solid content is maintained. The coating viscosity may be in a range of, for example, 500 cP to 2,500 cP, 700 cP to 2,500 cP, or 900 cP to 2,300 cP at 23° C. The pressure-sensitive adhesive composition including the block copolymer may have a viscosity at a level capable of effective coating in the state that the coating solid content is set high.

In addition, the pressure-sensitive adhesive composition may have a gel fraction of 80 weight % or less after a cross-linked structure is realized. The gel fraction can be calculated from the following General Formula 1:

$$\text{Gel fraction (\%)} = B/A \times 100 \qquad \text{[General Formula 1]}$$

In the General Formula 1, A represents a mass of the pressure-sensitive adhesive composition in which a cross-linked structure is realized, and B represents a dry weight of a non-dissolved parts obtained after putting the pressure-sensitive adhesive composition, of which a weight is A, in a 200-mesh net and immersing it in ethyl acetate at room temperature for 72 hours.

When the gel fraction is maintained at 80 weight % or less, excellent workability, dependability, and reworkability can be maintained. The lower limit of the gel fraction is not particularly limited, and may be, for example, 0 weight %. However, a gel fraction of 0 weight % does not mean that cross-linking is not carried out at all in the pressure-sensitive adhesive composition. For example, a pressure-sensitive adhesive composition having a gel fraction of 0 weight % may include a pressure-sensitive adhesive composition in which cross-linking is not carried out at all or a pressure-sensitive adhesive composition in which cross-linking is carried out to some degree but the degree of cross-linking is low, and, thus, gel is not maintained in the 200-mesh net but may leak from the net.

The pressure-sensitive adhesive composition can be used in various ways. Representatively, it can be applied to an optical film, but is not limited thereto. The application to the optical film may mean that the pressure-sensitive adhesive composition can be used for, for example, laminating optical films, or attaching an optical film or its laminate to another component such as a liquid crystal panel.

The present invention may relate to, for example, a pressure-sensitive adhesive optical member. The pressure-sensitive adhesive optical member may include an optical film and a pressure-sensitive adhesive layer formed on at least one surface of the optical film. The pressure-sensitive adhesive layer is formed of the above-described pressure-sensitive adhesive composition, and may include, for example, the pressure-sensitive adhesive composition in which a cross-linked structure is realized.

An optical film which can be included in the pressure-sensitive adhesive optical member is not particularly limited in kind, and may include, for example, a polarizing plate, a polarizer, a polarizer protection film, a protection film for the optical film, a retardation film, a compensation film for angular field of view, or a brightness enhancement film. In the present specification, the term "polarizer" and the term "polarizing plate" are distinguishable from each other. That is, the term "polarizer" indicates a film, a sheet, or an element itself which has a polarization function, and the term "polarizing plate" means an optical element including the polarizer together with other components. The other components which can be included in the optical element together with the polarizer may include a polarizer protection film or a retardation film, but are not limited thereto.

In an example, a carboxyl group may be present on a surface of the optical film included in the optical member. In this case, a pressure-sensitive adhesive layer may be attached to the surface on which the carboxyl group is present.

Further, the present invention relates to a polarizer; and a pressure-sensitive adhesive polarizing plate including a pressure-sensitive adhesive layer formed on a surface of the polarizer. The pressure-sensitive adhesive layer is formed of the above-described pressure-sensitive adhesive composition, and may include, for example, the pressure-sensitive adhesive composition in which a cross-linked structure is realized.

The polarizer included in the polarizing plate is not particularly limited in kind, and may employ general polarizers well known in the art, such as a polyvinylalcohol-based polarizer without limitation.

The polarizer is a functional film capable of extracting only light vibrating in one direction from incident light vibrating in various directions. For example, in the polarizer, a dichroic dye may be adsorbed and arranged to a polyvinylalcohol-based resin film. The polyvinylalcohol-based resin constituting the polarizer may be obtained by, for example, gelating a polyvinylacetate-based resin. In this case, the polyvinylacetate-based resin to be used may also include vinyl acetate and a copolymer of a monomer capable of being copolymerized with the vinyl acetate as well as a homopolymer of the vinyl acetate. The monomer capable of being copolymerized with the vinyl acetate may be, but is not limited to, one or a mixture of at least two of unsaturated carboxylic acids, olefins, vinylethers, unsaturated sulfonic acids, and acrylamides having an ammonium group. The degree of gelation of the polyvinylalcohol-based resin may be typically about 85 mol % to about 100 mol %, and preferably 98 mol % or more. The polyvinylalcohol-based resin may be further modified, and may be, for example, polyvinylformal or polyvinylacetal modified with an aldehyde. The degree of polymerization of the poylvinylalcohol-based resin may be typically about 1,000 to about 10,000, or about 1,500 to about 5,000.

The polarizer may be manufactured through stretching a polyvinylalcohol-based resin film (e.g., uniaxial stretching), dying the polyvinylalcohol-based resin film with a dichroic dye, adsorbing the dichroic dye, treating the polyvinylalcohol-based resin film to which the dichroic dye is adsorbed with a boric acid aqueous solution, and then washing the polyvinylalcohol-based resin film. As the dichroic dye, iodine or a dichroic organic pigment may be used.

The polarizing plate may further include a protection film attached to one or both surfaces of the polarizer, and in this case, the pressure-sensitive adhesive layer may be formed on one surface of the protection film. The protection film is not specifically limited in kind, and thus may include: a cellulose-based film formed of, for example, triacetyl cellulose (TAC); a polyester-based film such as a polycarbonate film or a poly(ethylene terephthalate) (PET) film; a polyethersulfone-based film; or a film having one layer or two or more layers of a laminated structure having a polyethylene film, a polypropylene film, or a polyolefin-based film prepared using a resin having a cyclo-based or norbornene structure or an ethylene-propylene copolymer, and more preferably, a cellulose-based film such as TAC may be used.

The polarizing plate may further include at least one functional layer selected from the group consisting of a protection layer, a reflective layer, an anti-glare layer, a retardation plate, a compensation film for wide angular field of view, and a brightness enhancement film.

In the present invention, a method of forming a pressure-sensitive adhesive layer on the polarizing plate or the optical member is not specifically limited. For example, there may be used a method of directly coating and curing the pressure-sensitive adhesive composition so as to realize a cross-linked structure, or a method of coating and curing the pressure-sensitive adhesive composition on a release-treated surface of a releasable film so as to form a cross-linked structure and transferring the resultant composition.

A method of coating a pressure-sensitive adhesive composition is not specifically limited, and may include, for example, a method of applying a pressure-sensitive adhesive composition using a typical means such as a bar coater.

For uniform coating, a multifunctional cross-linker included in the pressure-sensitive adhesive composition may be preferably controlled not to perform a cross-linking reaction of functional groups during the coating process. Accordingly, a cross-linked structure may be formed in a curing and aging process of the cross-linker after the coating process, and, thus, cohesion of the pressure-sensitive adhesive may be improved, and also, adhesive properties and cuttability may be improved.

Further, preferably, the coating process may be performed after a volatile component or a bubble-forming component such as reaction residue in the pressure-sensitive adhesive composition is sufficiently removed. Accordingly, it is possible to prevent problems that elasticity of the pressure-sensitive adhesive is decreased due to excessively low cross-linking density or molecular weight, and that bubbles present between a glass plate and a pressure-sensitive adhesive layer become larger at a high temperature, thereby forming a scatterer therein.

Furthermore, the present invention relates to a display device, for example, an LCD device. The display device may include, for example, the optical member or the polarizing plate. If the display device is an LCD device, the device may include a liquid crystal panel and the polarizing plate or optical member attached to one or both surfaces of the liquid crystal panel. The polarizing plate or optical member may be attached to the liquid crystal panel with the above-described pressure-sensitive adhesive. As a liquid crystal panel to be applied to the LCD device, a well-known panel such as a passive matrix-type panel including a twisted nematic (TN) panel, a super twisted nematic (S TN) panel, a ferroelectric (F) panel, or a polymer dispersed (PD) panel; an active matrix-type panel including a two or three terminal panel; an in-plane switching (IPS) panel; and a vertical alignment (VA) panel may be used.

The other components of the display device, for example, a color filter substrate or an upper and lower substrate such as an array substrate in an LCD device, are not specifically limited in kind, and a conformation well known in the art may be employed without limitation.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, a pressure-sensitive adhesive composition will be described in detail with reference to Examples and Comparative Examples, but a range of the pressure-sensitive adhesive composition is not limited by the following Examples.

1. Evaluation of Molecular Weight

A number average molecular weight (Mn) and a molecular weight distribution (PDI) were measured using a GPC under the following conditions. To prepare a calibration curve, measurement results were converted using standard polystyrene produced by Agilent System.

<Measurement Conditions>
Gauge: Agilent GPC (Agilent 1200 series, U.S.)
Column: Two PL Mixed Bs connected
Column Temperature: 40° C.
Eluent: THF (Tetrahydrofuran)
Flow Rate: 1.0 mL/min
Concentration: About 1 mg/mL (100 μL injection)

2. Coating Solid Content

A coating solid content was evaluated by the following method.

<Order of Measuring Coating Solid Content>

1) A weight (A) of an aluminum dish was measured.

2) Approximately 0.3 g to 0.5 g of each pressure-sensitive adhesive composition (sample before being dried) prepared in Examples or Comparative Examples was taken and put in the aluminum dish.

3) A small amount of a polymerization inhibitor solution (hydroquinone) (concentration: 0.5 weight %) dissolved in ethyl acetate was added to the pressure-sensitive adhesive composition using a pipette.

4) The resultant solution was dried in a 150° C. oven for about 30 minutes so as to remove a solvent.

5) The solution was cooled at room temperature for about 15 minutes to about 30 minutes, and a weight of the remaining component (weight of the sample after being dried) was measured.

6) Based on the measurement result, a coating solid content was evaluated according to the following Equation:

$$\text{Coating Solid Content (Unit: \%)}=100\times(DS-A)/(S+E) \quad \text{<Equation>}$$

DS: Weight (A) of Aluminum Dish+Weight of Sample After being Dried (Unit: g)
A: Weight of Aluminum Dish (Unit: g)
S: Weight of Sample Before being Dried (Unit: g)
E: Weight of Removed Component (e.g., Solvent) (Unit: g)

3. Evaluation of Viscosity

A viscosity of the pressure-sensitive adhesive composition was evaluated using a gauge (Brookfield digital viscometer (DV-I+, DV-II+Pro)) by the following method:

<Order of Measuring Viscosity>

1) 180 mL of the pressure-sensitive adhesive composition (sample) was put into a beaker and left for about 1 hour in a constant temperature/constant humidity condition (23° C./relative humidity: 50%) to remove bubbles.

2) A liquid surface of the pressure-sensitive adhesive composition (sample) was set not to deeply touch a groove of a spindle, and the spindle was tilted and put into the sample so as not to make bubbles.

3) The spindle was connected to the viscometer, and the liquid surface of the sample was adjusted to the groove of the spindle.

4) A set speed key was pressed to select an RPM of the spindle.

5) A motor on/off key was pressed to operate the viscometer. A value was obtained when a viscosity value displayed on the screen was stabilized. An RPM having a confidence interval of about 10% or more was checked from a display and fixed, and then, a viscosity was measured.

4. Evaluation of Coatability

Each of pressure-sensitive adhesive compositions prepared in Examples and Comparative Examples was coated, a coating layer was observed with the naked eye, and coatability was evaluated according to the following criteria:

<Evaluation Criteria>
A: Neither bubbles nor stripes on a coating layer are observed with the naked eye.
B: Fine bubbles and/or stripes on a coating layer are observed with the naked eye.
C: Bubbles and/or stripes on a coating layer are clearly observed with the naked eye.

5. Evaluation of Heat-Resistant and Wet Heat-Resistant Durability

Polarizing plates prepared in Examples and Comparative Examples were cut into pieces having a width of about 180 mm and a length of about 320 mm to prepare samples. The samples were attached to a 19-inch commercially available panel. Then, the panel was kept in an autoclave (50° C., 5 atm) for about 20 minutes to prepare samples. The heat-resistant durability of the prepared samples was evaluated according to the following evaluation criteria after the samples were kept at 80° C. for 500 hours and observing appearance of bubbles and peels, and the wet heat-resistant durability was evaluated according to the following evaluation criteria after the samples were left at 60° C. with a relative humidity of 90% for 500 hours and then observing appearance of bubbles and peels at a pressure-sensitive adhesive interface:

<Evaluation Criteria>
A: Bubbles and peels are not generated.
B: Bubbles and/or peels are slightly generated.
C: Bubbles and/or peels are highly generated.

6. Evaluation of Normal Temperature and Low Humidity Durability after Wet Heat-Resistance Polarizing plates prepared in Examples and Comparative Examples were cut into pieces having a width of about 180 mm and a length of about 320 mm to prepare samples. The samples were attached to a 19-inch commercially available panel. Then, the panel was kept in an autoclave (50° C., 5 atm) for about 20 minutes to prepare samples. The normal temperature and low humidity durability after wet heat-resistance of the prepared samples was evaluated according to the following evaluation criteria after the samples were left at 60° C. with a relative humidity of 90% for 500 hours and observing appearance of bubbles and peels at a pressure-sensitive adhesive interface, and then, the sample satisfying the evaluation criterion A was re-evaluated according to the following evaluation criteria after being left at 25° C. with a relative humidity of 25% for 500 hours:

<Evaluation Criteria>
A: Bubbles and peels are not generated.
B: Bubbles and/or peels are slightly generated.
C: Bubbles and/or peels are highly generated.

7. Calculation of Glass Transition Temperature

Glass transition temperatures Tg of the respective blocks of the block copolymer were calculated according to the following Equation:

$$1/Tg = \Sigma Wn/Tn \quad \text{<Equation>}$$

In the above Equation, Wn represents a weight fraction of a monomer used in each block, and Tn represents a glass transition temperature when the monomer used forms a homopolymer.

That is, the right hand side in the above Equation is the sum of values (Wn/Tn) of respective monomers calculated by dividing a weight fraction of a monomer used by a glass transition temperature when the monomer forms a homopolymer.

8. Measurement of Conversion Rate and Composition Ratio of Monomer

Conversion rates of methyl methacrylate (MMA) as a main monomer constituting a first block and butyl acrylate (BA) as a main monomer constituting a second block during polymerization in block copolymers of Examples and Comparative Examples and composition contents thereof in the block copolymers were calculated according to the following Equation based on a result of 1H-NMR.

<MMA Conversion Rate>

MMA Conversion Rate (%)=100×$B/(A+B)$

In the above Equation, A represents an area of a peak (around 3.4 ppm to 3.7 ppm) derived from a methyl group induced from MMA included in the polymer in the 1H-NMR spectrum, and B represents an area of a peak (around 3.7 ppm) derived from a methyl group of unpolymerized MMA. That is, a conversion rate of the monomer was calculated in consideration of a movement position of the methyl group peak in the MMA structure.

<BA Conversion Rate >

BA Conversion Rate (%)=100×$C/(C+D)$

In the above Equation, D represents an area of a peak (around 5.7 ppm to 6.4 ppm) derived from =$CH_2$ at a double bond terminal of BA in the 1H-NMR spectrum, and C represents an area of a peak (around 3.8 ppm to 4.2 ppm) derived from —$OCH_2$-present in the polymer formed by polymerization of BA. That is, a conversion ratio of BA was measured by calculating relative values of the =$CH_2$ peak of BA and the —$OCH_2$— peak of the polymer.

<Calculation of Composition Ratio>

A ratio between a first block and a second block in a block copolymer was calculated according to the following Equation based on a ratio between methyl methacrylate (MMA) and butyl acrylate (BA) as main monomers constituting the first block and the second block, respectively.

MMA Content (%) in Block Copolymer=100×MMA Peak Area/BA Peak Area     <Equation>

In the above Equation, the MMA peak area is an area per 1H proton of the peak (peak observed due to —$CH_3$ derived from MMA) around 3.4 ppm to 3.7 ppm in the 1H-NMR, and the BA peak area is an area per 1H proton of the peak (peak observed due to —$OCH_2$— present in the polymer formed of BA) around 3.8 ppm to 4.2 ppm in the 1H-NMR.

That is, a weight ratio between the first and second blocks was calculated by calculating relative values of the —$CH_3$ peak of the MMA structure and the —$OCH_2$— peak of the polymer formed of BA.

9. Evaluation of Transparency

Each of the pressure-sensitive adhesive compositions prepared in Examples or Comparative Examples was coated onto a release-treated surface of a 38 μm-thick PET (poly (ethyleneterephthalate)) film (MRF-38 manufactured by Mitsubishi Corporation) release-treated so that a thickness after drying could be about 40 μm, and kept at 110° C. for about 3 minutes in an oven. Then, transparency of the coated pressure-sensitive adhesive layer was observed with the naked eye and evaluated according to the following evaluation criteria.

<Evaluation Criteria>

A: A coated layer is very transparent.

B: A coated layer is slightly transparent, opaque, or extremely opaque.

PREPARATION EXAMPLE 1

Preparation of Block Copolymer (A1)

0.1 g of EBiB (ethyl 2-bromoisobutyrate) and 14.2 g of methyl methacrylate (MMA) were mixed with 6.2 g of ethyl acetate (EAc). A flask of the mixture was sealed with a rubber film, and the mixture was nitrogen-purged and stirred at about 25° C. for about 30 minutes. Then, dissolved oxygen was removed by bubbling. Then, 0.002 g of $CuBr_2$, 0.005 g of TPMA(tris(2-pyridylmethyl)amine), and 0.017 g of V-65 (2,2'-azobis(2,4-dimethyl valeronitrile)) were added to the mixture from which oxygen was removed, and the resultant mixture was immersed in a reactor at about 67° C. to initiate a reaction (polymerization of a first block). At the time when a conversion rate of methyl methacrylate was about 75%, a mixture of 115 g of butyl acrylate (BA) previously undergoing bubbling with nitrogen, 0.8 g of hydroxyl butyl acrylate (HBA), and 250 g of ethyl acetate (EAc) was added thereto in the presence of nitrogen. Then, 0.006 g of $CuBr_2$, 0.01 g of TPMA, and 0.05 g of V-65 were put into the reaction flask to carry out a chain extension reaction (polymerization of a second block). When a conversion rate of the monomer (BA) reached 80% or more, the reaction mixture was exposed to oxygen and diluted in an adequate solvent to terminate the reaction, thereby preparing a block copolymer (In the above process, V-65 was appropriately added in installments in consideration of its half-life until the reaction was terminated.).

PREPARATION EXAMPLES 2 TO 7

Preparation of Block Copolymers (A2 to A4 and B1 to B3)

Block copolymers were prepared in the same manner as Preparation Example 1 except that kinds of materials and additives used in polymerizing a first block were controlled as shown in the following Table 1, and kinds of materials and additives used in polymerizing a second block were controlled as shown in the following Table 2.

TABLE 1

| | | Material | | | | | | |
|---|---|---|---|---|---|---|---|---|
| | | MMA | BMA | HPMA | EBiB | EA | $CuBr_2$ | TPMA | V-65 |
| Block copolymer | A1 | 14.2 | — | — | 0.1 | 6.2 | 0.002 | 0.005 | 0.017 |
| | A2 | 11.2 | 2.8 | — | 0.08 | 6.1 | 0.002 | 0.005 | 0.016 |
| | A3 | 9.4 | 6.3 | — | 0.07 | 6.8 | 0.002 | 0.005 | 0.016 |
| | A4 | 35.8 | 15.3 | — | 0.1 | 22 | 0.008 | 0.016 | 0.055 |
| | B1 | 11.6 | 2.4 | 0.4 | 0.08 | 6.2 | 0.002 | 0.005 | 0.016 |
| | B2 | 11.6 | 2.4 | 0.4 | 0.08 | 6.2 | 0.002 | 0.005 | 0.016 |
| | B3 | 5.8 | — | — | 0.1 | 2.5 | 0.001 | 0.002 | 0.007 |

Content unit: g
MMA: methyl methacrylate (Homopolymer Tg: about 110° C.)
BMA: butyl methacrylate (Homopolymer Tg: about 27° C.)
HPMA: 2-hydroxypropyl methacrylate (Homopolymer Tg: about 26° C.)
EBiB: ethyl 2-bromoisobutyrate
EA: ethyl acetate
TPMA: tris(2-pyridylmethyl)amine
V-65: 2,2'-azobis(2,4-dimethyl valeronitrile)

TABLE 2

| | | \multicolumn{6}{c|}{Material} |
|---|---|---|---|---|---|---|---|
| | | BA | HBA | EA | $CuBr_2$ | TPMA | V-65 |
| Block copolymer | A1 | 115 | 0.8 | 250 | 0.006 | 0.01 | 0.05 |
| | A2 | 151 | 4.7 | 250 | 0.006 | 0.01 | 0.05 |
| | A3 | 146 | 9.3 | 250 | 0.006 | 0.01 | 0.05 |
| | A4 | 113 | 5.9 | 234 | 0.0002 | 0.0004 | 0.047 |
| | B1 | 156 | — | 250 | 0.006 | 0.01 | 0.05 |
| | B2 | 151 | 4.7 | 250 | 0.006 | 0.01 | 0.05 |
| | B3 | 163 | 0.8 | 250 | 0.006 | 0.01 | 0.05 |

Content unit: g
BA: butyl acrylate (Homopolymer Tg: about −45° C.)
HBA: 4-hydroxybutyl acrylate (Homopolymer Tg: about −80° C.)
EA: ethyl acetate
TPMA: tris(2-pyridylmethyl)amine
V-65: 2,2'-azobis(2,4-dimethyl valeronitrile)

Properties of the respective block copolymers prepared by the above method are as shown in the following Table 3.

TABLE 3

| | | \multicolumn{7}{c|}{Block copolymer} |
|---|---|---|---|---|---|---|---|---|
| | | A1 | A2 | A3 | A4 | B1 | B2 | B3 |
| First block | MMA ratio | 100 | 80 | 60 | 70 | 81 | 81 | 100 |
| | BMA ratio | 0 | 20 | 40 | 30 | 16 | 16 | 0 |
| | HPMA ratio | 0 | 0 | 0 | 0 | 3 | 3 | 0 |
| | Tg (° C.) | 110 | 90 | 72 | 80 | 90 | 90 | 110 |
| | Mn (×10000) | 1.9 | 2.3 | 2.9 | 3.8 | 2.3 | 2.3 | 0.8 |
| | PDI | 1.27 | 1.34 | 1.38 | 1.41 | 1.36 | 1.36 | 1.18 |
| Second block | BA ratio | 99.5 | 97.0 | 94.0 | 95.0 | 100 | 97.0 | 99.5 |
| | HBA ratio | 0.5 | 3.0 | 6.0 | 5.0 | 0 | 3.0 | 0.5 |
| | Tg (° C.) | −47 | −46.2 | −47.5 | −47.0 | −45 | −46.2 | −47.0 |
| Block copolymer | Mn (×10000) | 10.6 | 12.3 | 14.1 | 10.4 | 12.4 | 12.2 | 10.1 |
| | PDI | 1.7 | 1.8 | 2.1 | 2.1 | 1.8 | 1.8 | 1.6 |
| | First block: Second block (Weight ratio) | 10.5:89.5 | 10.1:89.9 | 11.2:88.8 | 34.7:65.3 | 10.1:89.9 | 10.1:89.9 | 4.2:95.8 |

Monomer ratio unit: part by weight
MMA: methyl methacrylate (Homopolymer Tg: about 110° C.)
BMA: butyl methacrylate (Homopolymer Tg: about 27° C.)
HPMA: 2-hydroxypropyl methacrylate (Homopolymer Tg: about 26° C.)
BA: butyl acrylate (Homopolymer Tg: about −45° C.)
HBA: 4-hydroxybutyl acrylate (Homopolymer Tg: about −80° C.)
Tg: glass transition temperature
Mn: number average molecular weight
PDI: molecular weight distribution

PREPARATION EXAMPLE 8

Preparation of Random Copolymer (C1)

10 parts by weight of methyl methacrylate (MMA), 87.3 parts by weight of n-butyl acrylate, and 2.7 parts by weight of hydroxyl butyl acrylate (HBA) were put into a 1 L reactor in which a nitrogen gas is refluxed and which has a cooling apparatus to facilitate temperature control, and n-dodecyl mercaptane in an amount of 200 ppm was added thereto as a molecular weight regulator, and then, 120 parts by weight of ethyl acetate was added thereto as a solvent. Thereafter, the reactor was purged with a nitrogen gas for about 60 minutes to remove oxygen. In the state where a temperature was maintained at 60° C., 0.05 part by weight of azobisisobutyronitrile (AIBN) was added as a reaction initiator, and a reaction was carried out for about 8 hours, thereby preparing a random copolymer. The prepared random copolymer (C1) had a number average molecular weight (Mn) of about 132,000 and a molecular weight distribution (PDI) of about 4.6.

PREPARATION EXAMPLE 9

Preparation of Random Copolymer (C2)

98 parts by weight of butyl acrylate (BA) and 2 parts by weight of hydroxyl butyl acrylate (HBA) were put into a 1 L reactor in which a nitrogen gas is refluxed and which has a cooling apparatus to facilitate temperature control, and n-dodecyl mercaptane in an amount of 350 ppm was added thereto as a molecular weight regulator, and then, 120 parts by weight of ethyl acetate was added thereto as a solvent. Thereafter, the reactor was purged with a nitrogen gas for about 60 minutes to remove oxygen. In the state where a temperature was maintained at 60° C., 0.03 parts by weight of azobisisobutyronitrile (AIBN) was added as a reaction initiator, and a reaction was carried out for about 8 hours, thereby preparing a random copolymer. The prepared random copolymer (C2) had a number average molecular weight (Mn) of about 310,000 and a molecular weight distribution (PDI) of about 3.3.

PREPARATION EXAMPLE 10

Preparation of Random Copolymer (C3)

98 parts by weight of butyl acrylate (BA) and 2 parts by weight of hydroxyl butyl acrylate (HBA) were put into a 1 L reactor in which a nitrogen gas is refluxed and which has a cooling apparatus to facilitate temperature control, and n-dodecyl mercaptane in an amount of 600 ppm was added thereto as a molecular weight regulator, and then, 120 parts by weight of ethyl acetate was added thereto as a solvent. Thereafter, the reactor was purged with a nitrogen gas for about 60 minutes to remove oxygen. In the state where a temperature was maintained at 60° C., 0.03 parts by weight of azobisisobutyronitrile (AIBN) was added as a reaction initiator, and a reaction was carried out for about 8 hours, thereby preparing a random copolymer. The prepared random copolymer (C3) had a number average molecular weight (Mn) of about 178,000 and a molecular weight distribution (PDI) of about 2.8.

EXAMPLE 1

Preparation of Coating Solution (Pressure-sensitive Adhesive Composition)

A coating solution (pressure-sensitive adhesive composition) was prepared by mixing 15 parts by weight of the random copolymer (C2) prepared in Preparation Example 9, 0.04 parts by weight of a cross-linker (Coronate L, produced by NPU, Japan), 0.1 parts by weight of DB TDL (Dibutyltin dilaurate), and 0.2 part by weight of a silane coupling agent having a β-cyanoacetyl group with respect to 100 parts by weight of the block copolymer (A1) prepared in Preparation Example 1, and mixing the resultant mixture with ethyl acetate as a solvent such that a coating solid content could be about 31 weight %.

Preparation of Pressure-sensitive Adhesive Polarizing Plate

The prepared coating solution was coated onto a release-treated surface of a 38 μm-thick PET (poly(ethylene-terephthalate)) film (MRF-38 manufactured by Mitsubishi Corporation) release-treated so that a thickness after drying could be about 23 μm, and kept at 110° C. for about 3 minutes in an oven. A pressure-sensitive adhesive polarizing plate was prepared by laminating the coating layer formed on the release-treated PET film on a WV (Wide View) liquid crystal layer of a polarizing plate (TAC/PVA/TAC-laminated structure: TAC=triacetyl cellulose, PVA=polyvinyl alcohol-based polarizing film), of which one surface was coated with the WV liquid crystal layer, after drying.

EXAMPLE 2 AND COMPARATIVE EXAMPLES 1 TO 12

A pressure-sensitive adhesive composition (coating solution) and a pressure-sensitive adhesive polarizing plate were prepared in the same manner as Example 1 except that each component and a ratio were regulated as shown in the following Table 4 when the pressure-sensitive adhesive composition (coating solution) was prepared. However, in the case of Comparative Example 8, a pressure-sensitive adhesive composition (coating solution) and a pressure-sensitive adhesive polarizing plate were prepared by regulating each component and a ratio as shown in Table 4 with respect to 100 parts by weight of the random copolymer C1 prepared in Preparation Example 8.

TABLE 4

|  |  | Example | | Comparative Example | | | | | | | | | | | |
|---|---|---|---|---|---|---|---|---|---|---|---|---|---|---|---|
|  |  | 1 | 2 | 1 | 2 | 3 | 4 | 5 | 6 | 7 | 8 | 9 | 10 | 11 | 12 |
| Block copolymer | Kind | A2 | A2 | A1 | A2 | A3 | A4 | B1 | B2 | B3 | — | A2 | A2 | A2 | A2 |
| | Content | 100 | 100 | 100 | 100 | 100 | 100 | 100 | 100 | 100 | — | 100 | 100 | 100 | 100 |
| Random copolymer | Kind | C2 | C2 | — | — | — | — | — | — | — | C1 | C3 | C3 | C2 | C2 |
| | Content | 15 | 10 | — | — | — | — | — | — | — | 100 | 20 | 40 | 3 | 60 |
| Cross-linker content | | 0.04 | 0.07 | 0.04 | 0.07 | 0.2 | 0.2 | 0.07 | 0.07 | 0.07 | 0.07 | 0.07 | 0.07 | 0.07 | 0.07 |
| DBTDL content | | 0.1 | 0.1 | 0.1 | 0.1 | 0.1 | 0.1 | 0.1 | 0.1 | 0.1 | 0.1 | 0.1 | 0.1 | 0.1 | 0.1 |
| SCA content | | 0.2 | 0.2 | 0.2 | 0.2 | 0.2 | 0.2 | 0.2 | 0.2 | 0.2 | 0.2 | 0.2 | 0.2 | 0.2 | 0.2 |
| Coating solid content | | 31 | 28 | 33 | 30 | 28 | 23 | 30 | 30 | 35 | 25 | 28 | 25 | 30 | 25 |
| Coating solution viscosity (23° C.) | | 1850 | 1860 | 1860 | 1760 | 1700 | 1690 | 1650 | 1920 | 1770 | 1900 | 1920 | 1990 | 1860 | 3900 |
| Haze of pressure-sensitive adhesive | | x | x | x | x | x | x | x | x | x | x | x | x | x | ○ |

Content unit: part by weight
Cross-linker: Coronate L, produced by NPU, Japan
DBTDL: dibutyltin dilaurate
SCA: silane coupling agent having a β-cyanoacetyl group (M812, produced by LG Chem.)
Coating solid content unit: weight %
Coating solution viscosity: cP Property evaluation results of the respective Examples and Comparative Examples are as shown in the following Table 5.

TABLE 5

|  | Example | | Comparative Example | | | | | | | | | | | |
|---|---|---|---|---|---|---|---|---|---|---|---|---|---|---|
|  | 1 | 2 | 1 | 2 | 3 | 4 | 5 | 6 | 7 | 8 | 9 | 10 | 11 | 12 |
| Coatability | A | A | A | A | A | A | A | A | A | A | A | A | A | C |
| Heat-resistant durability | A | A | A | A | A | A | C | B | C | C | A | A | A | A |
| Wet heat-resistant durability | A | A | A | A | A | A | C | B | C | B | A | A | A | A |
| Normal temperature low humidity durability | A | A | C | C | C | C | — | — | — | — | C | B | C | A |
| Transparency | A | A | A | A | A | A | A | A | A | A | A | A | A | B |

The pressure-sensitive adhesive composition of the present invention can form a pressure-sensitive adhesive having excellent durability and light leakage prevention property under severe conditions such as a high temperature condition, a high temperature and high humidity condition, or under a severe condition where a high temperature/high humidity and a normal temperature/low humidity are repeated.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A pressure-sensitive adhesive composition comprising:
   a block copolymer including a first block having a glass transition temperature of 50° C. or more and a second block having a glass transition temperature of −10° C. or less;
   an acrylic random copolymer including a cross-linkable functional group; and
   a multifunctional cross-linker,
   wherein the acrylic random copolymer has a number average molecular weight (Mn) of 200,000 or more, and
   wherein the acrylic random copolymer is comprised in an amount of 5 parts by weight to 50 parts by weight, relative to 100 parts by weight of the block copolymer.

2. The pressure-sensitive adhesive composition of claim 1, wherein the block copolymer comprises 5 parts by weight to 50 parts by weight of the first block and 50 parts by weight to 95 parts by weight of the second block.

3. The pressure-sensitive adhesive composition of claim 1, wherein the second block of the block copolymer comprises a cross-linkable functional group.

4. The pressure-sensitive adhesive composition of claim 3, wherein the cross-linkable functional group of the acrylic random copolymer is the same as the cross-linkable functional group of the block copolymer.

5. The pressure-sensitive adhesive composition of claim 4, wherein the cross-linkable functional group is a hydroxyl group.

6. The pressure-sensitive adhesive composition of claim 1, wherein the second block of the block copolymer comprises a polymerized unit induced from 90 to 99.9 parts by weight of a (meth)acrylic acid ester monomer and 0.1 to 10 parts by weight of a copolymerizable monomer having a cross-linkable functional group.

7. The pressure-sensitive adhesive composition of claim 1, wherein the block copolymer has a molecular weight distribution (PDI) of 1.0 to 2.5.

8. The pressure-sensitive adhesive composition of claim 1, wherein the acrylic random copolymer comprises a polymerized unit derived from 90 to 99.9 parts by weight of a (meth)acrylic acid ester monomer and 0.1 to 10 parts by weight of a copolymerizable monomer having a cross-linkable functional group.

9. The pressure-sensitive adhesive composition of claim 1, wherein the acrylic random copolymer has a molecular weight distribution (PDI) of 2.0 to 4.5.

10. The pressure-sensitive adhesive composition of claim 1, wherein the multifunctional cross-linker is comprised in an amount of 0.01 part by weight to 10 parts by weight, relative to 100 parts by weight of the block copolymer.

11. The pressure-sensitive adhesive composition of claim 1, wherein a coating solid content is 20 weight % or more.

12. The pressure-sensitive adhesive composition of claim 1, wherein a coating viscosity is 500 cP to 3,000 cP at 23° C.

13. The pressure-sensitive adhesive composition of claim 1, wherein after a cross-linked structure is realized, a gel fraction is 80 weight % or less according to the following General Formula 1:

$$\text{Gel fraction (\%)} = B/A \times 100 \qquad \text{[General Formula 1]}$$

wherein in the General Formula 1, A represents a mass of the pressure-sensitive adhesive composition in which a cross-linked structure is realized, and B represents a dry weight of a non-dissolved parts obtained after putting the pressure-sensitive adhesive composition, of which a weight is A, in a 200-mesh net and immersing it in ethyl acetate at room temperature for 72 hours.

14. A pressure-sensitive adhesive optical member comprising:
   an optical film; and
   a pressure-sensitive adhesive layer which is formed on one or both surfaces of the optical film, and comprises a cross-linked pressure-sensitive adhesive composition of claim 1.

15. A display device comprising an optical member of claim 14.

16. A pressure-sensitive adhesive polarizing plate comprising:
   a polarizer; and
   a pressure-sensitive adhesive layer which is formed on one or both surfaces of the polarizer, and comprises a cross-linked pressure-sensitive adhesive composition of claim 1.

17. A display device comprising a polarizing plate of claim 16.

* * * * *